W. H. ROBERTSON.
ILLUMINATED LEVEL.
APPLICATION FILED MAY 3, 1917.
1,247,154.
Patented Nov. 20, 1917.
2 SHEETS—SHEET 2.
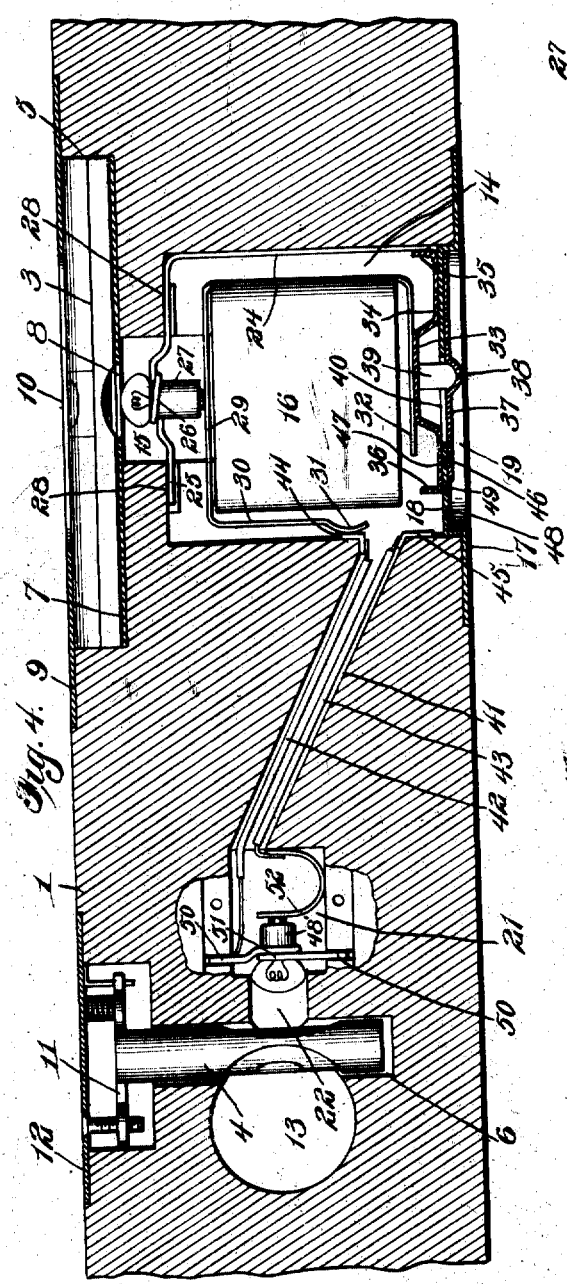
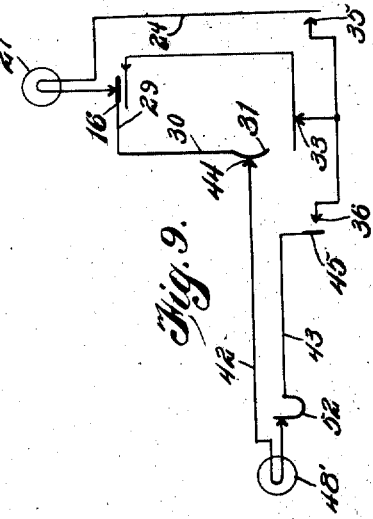
Fig. 9.
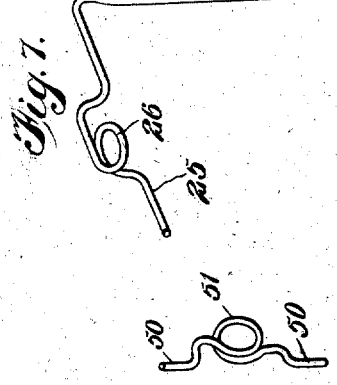
Fig. 7.
Fig. 8.
Witnesses:
L. R. Heinrichs
M. E. Ernstein
Inventor
William H. Robertson
By C. C. Hines,
Atty

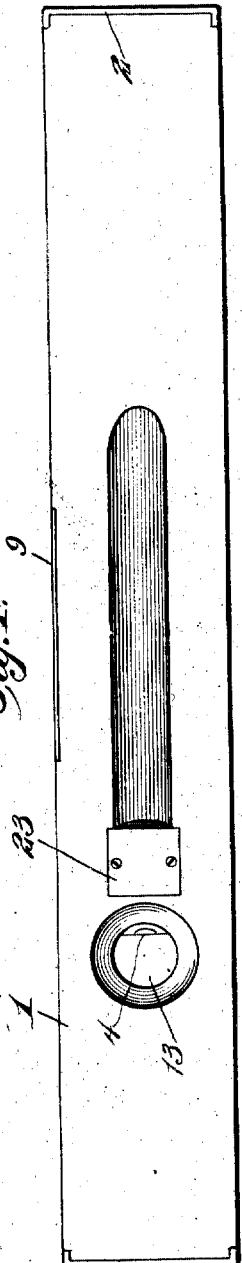
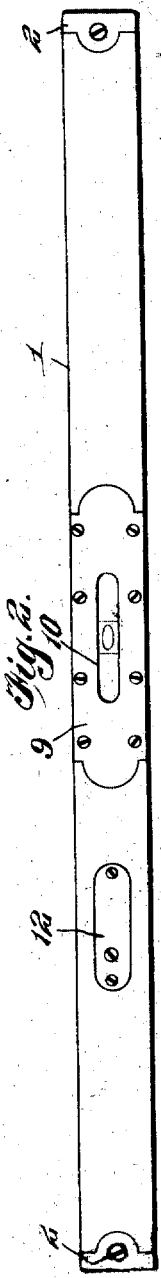
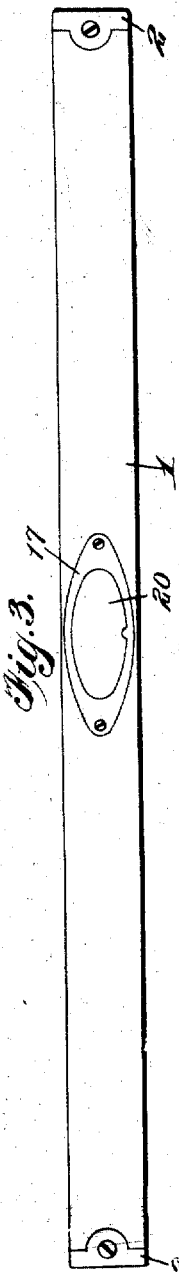
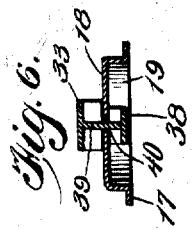
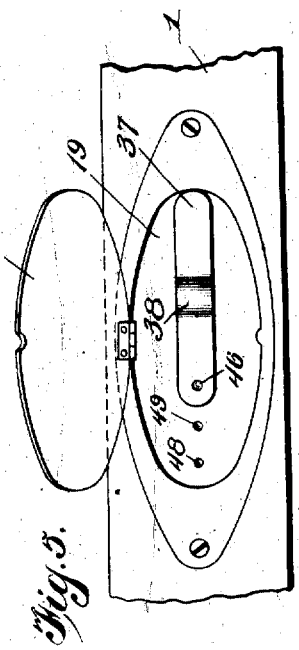

UNITED STATES PATENT OFFICE.

WILLIAM HENRY ROBERTSON, OF BREWSTER, NEW YORK.

ILLUMINATED LEVEL.

1,247,154.  Specification of Letters Patent.  Patented Nov. 20, 1917.

Application filed May 3, 1917. Serial No. 166,211.

*To all whom it may concern:*

Be it known that I, WILLIAM H. ROBERTSON, a citizen of the United States, residing at Brewster, in the county of Putnam and State of New York, have invented new and useful Improvements in Illuminated Levels, of which the following is a specification.

This invention relates to improvements in spirit levels, the primary object of the invention being to provide a level having means for illuminating the level indicator or indicators thereof, whereby the level may be used with convenience at night or in dark and ordinarily inaccessible places, allowing the operator to readily level or plumb his work under all conditions of service, and whereby the level is further adapted for use as a searchlight or lamp, allowing the operator to find his way in traversing dark streets or passages with facility.

A further object of the invention is to provide an illuminating level and plumb employing level and plumb indicators of the bubble tube type, wherein provision is made for easily and conveniently illuminating either level tube at will, the construction being such that all the parts are housed and protected within the body or stock of the instrument, and yet may be readily and conveniently removed for repairs or replacement whenever necessary.

A still further object of the invention is to provide means for mounting the battery and lamps in such a manner as to effectively cushion them against shocks and jars, so that damage to the working parts will be prevented even when the level is roughly handled.

A still further object of the invention is to provide a simple construction of illuminated level which may be manufactured and sold at a comparatively low cost, and which allows ordinary dry battery cells and standard electric bulbs of a desired candlepower to be used.

With these and other objects in view, the invention consists of the features of construction, combination and arrangement of parts hereinafter fully described and claimed, reference being had to the accompanying drawings, in which:—

Figure 1 is a side elevation of a combined level and plumb constructed in accordance with my invention.

Fig. 2 is a top plan view of the same.

Fig. 3 is a bottom plan view of the combined level and plumb.

Fig. 4 is a vertical longitudinal section through a portion of the stock on an enlarged scale, showing the bubble tube and illuminating mechanism.

Fig. 5 is a bottom plan view of a portion of the stock showing the switch actuating slide and the cover for concealing and protecting the same.

Fig. 6 is a vertical transverse section through the bottom plate of the battery chamber and the switch device carried thereby.

Figs. 7 and 8 are perspective views of the lamp supporting brackets and terminals.

Fig. 9 is a diagrammatic view of the electric circuit.

Referring now more particularly to the drawings, 1 designates the body or stock of the instrument which is preferably made, as usual, of wood and provided with the ordinary metallic end tips or protectors 2. This stock carries level and plumb indicators 3 and 4, consisting of bubble tubes of any ordinary or desired construction, the tube 3 being disposed in a recess 5 formed in the top of the stock and the tube 4 in a passage or chamber 6 formed in the body of the stock. The tube 3 rests upon the usual bed plate 7 having a light passage or opening 8, and is held in position against displacement by a face plate 9 let into the top of the stock and provided with an observation slot or opening 10, through which the bubble is exposed. The tube 4 is resiliently supported by a suspension bracket 11 carried by a supporting plate 12, and is arranged so as to expose its bubble through a transverse sight opening or passage 13. The parts as thus far decribed may be of any ordinary or preferred construction and of the types commonly used in devices of this kind.

In carrying my invention into practice I provide the stock 1 with a cut out portion forming a battery chamber 14 which communicates at its top with a lamp chamber 15 arranged in alinement with the slot or opening 8 in the bed plate 7. This chamber 14 receives a dry cell battery 16 and is closed at its base by a plate 17 let into the bottom of the stock. Preferably this plate 17 is provided with an upstanding or offset portion 18 extending into the base of the chamber 14 and forming an external switch receiving chamber 19 adapted to be closed by a hinged or pivoted cover plate 20, which conceals and protects the circuit controlling switch member from injury, as hereinafter fully described.

A second lamp chamber 21 is formed in the body of the stock in proximity to the passage 6 and communicates with said passage and the sight opening 13 through a light passage 22, arranged in alinement with the bubble center of the level 4. This chamber 21 opens through one side of the stock 1 and is closed at such open side by a cover plate 23. The plates 17 and 23 are detachably secured in position so that they may be removed whenever desired to afford access to the chambers 14 and 21 for the purpose of cleaning, repairing, or replacing any of the parts of the illuminating mechanism.

Disposed within one side of the chamber 14 and retained by grooves or other holding means therein is a conductor 24 forming a contact arm or strip, which is disposed at its lower end in proximity to the offset 18. Integral with the upper end of the strip and projecting at right angles therefrom is a lamp supporting arm or bracket 25 which is provided with a central coil 26 to receive and hold a lamp bulb 27. The arm 25 engages retaining grooves or recesses 28 in the stock and yieldingly supports the bulb 27 and serves to absorb shocks and jars, and also serves as a terminal which is in constant engagement with one of the terminals of the bulb through the casing thereof. The other terminal of the bulb or lamp 27 engages a resilient contact strip 29 extending across the top of the battery 16 and connected at one end with one of the poles thereof, the free end of said strip terminating in a depending arm 30 terminating in a contact piece 31 lying at one side of the battery and between the same and one of the side walls of the chamber 14. A second resilient contact strip 32 extends beneath and in parallel relation to the bottom of the battery and is fixed at one end thereto, and said strip 32 rests upon the upwardly offset or bowed portion 33 of a sliding switch plate or member 34, whereby the battery is supported in position within the casing 14. It will be understood from the construction described that the battery will be held by the spring pressure of the members 25, 29 and 32 between the offset portion 18 of the plate 17 and the upper wall of the chamber 14, and that these members will serve also as a cushioning and electrical contact means, whereby the battery will be supported in proper operative relationship and at the same time protected from injury from shocks, jars or vibrations in transporting and depositing the instrument, etc.

The switch plate or member 34 is provided at its opposite ends with upwardly bent contact pieces 35 and 36, and is adapted to be operated by means of a controlling slide 37 disposed within the chamber 14 on the underside of the plate 18 and formed with a depressed portion or boss 38 providing a finger piece whereby it may be grasped and actuated upon exposing the slide by swinging the cover plate 20 to open position. A bridge plate or connecting piece 39 extends between the slide and offset portion 32 of the switch plate and is movable in a slot 40 in the plate 18, thus allowing the switch member to be moved longitudinally of the stock within the chamber 14.

The chamber 14 is connected with the chamber 21 through a passage 41, and extending through said passage are insulated conducting wires 42 and 43. The wires 42 and 43 extend at one end into the chamber 14 and are connected with contacts 44 and 45 disposed therein, the contact 44 being normally in engagement with the contact 31 connected with one pole of the battery, while the contact 45 is adapted to be engaged by the switch contact 36 to connect it with the other pole of the battery and thereby establish an electric circuit through said conductors 42 and 43. The contact 35 of the switch 34 is adapted to engage the contact strip 24, whereby a circuit may be established in an obvious manner from the positive pole of the battery through the strip 29 to and through the lamp 27, and through the strip 24, contact 35, switch 34, and strip 32 to the other pole of the battery, thereby causing the lamp 27 to glow to illuminate the chamber 15 and the spirit level 3, as will be readily understood. The switch controlling or actuating slide 37 is provided with a punched projection 46 forming a spring locking detent adapted for engagement with locking recesses 47, 48 and 49 in the plate 18, for holding said slide in adjusted position. When the projection 46 engages the recess 47 the slide is at the limit of its movement in one direction, in which position the contact 35 engages the strip 24 and closes the circuit to light the lamp 27. When the detent 47 engages the recess 48 the slide is at the limit of its opposite movement in which the contact 36 engages the contact 45 to close the circuit through the conductors 42 and 43 to cause a lamp 48 within the lamp chamber 21 to glow, whereby the two lamps 27 and 48 may be independently thrown into and out of connection with the battery. When the detent 37 is in engagement with the intermediate or central recess 49 the switch will be in a central or neutral position, in which the battery circuits will be broken and the lamps deënergized as will be readily understood.

The lamp 48 is carried by a resilient bracket arm and terminal 50 having a coil 51 embracing the same and supporting said lamp in line with the passage 22. The arm 50 is fitted in suitable retaining grooves in the stock or in the cover plate 23 and may be mounted so as to be exposed by the cover plate upon removal of the latter, or may be carried by said cover plate for detachment therewith. The arm 50 is in electrical connection with one pole of the lamp 48 and with the conductor 42, and the other pole of the lamp is in electrical connection with a bowed spring terminal 52 which bears thereon and is connected with the conductor 43, the pressure of said spring terminal 52 coöperating with the coil 51 of the arm 50 to resiliently support the lamp 48 in position and to form cushioning means to take up and absorb all shocks and jars and prevent transmission of the same to the lamp, thus preventing injury to the lamp in the handling of the tool. It will be evident from the construction and operation of the parts heretofore described that by moving the switch to one of its circuit closing positions the lamp 27 will be lighted to illuminate the spirit level 3, while by moving the switch to its other operative position the lamp 48 will be lighted to illuminate the spirit level 4, and that when the switch is in neutral position neither lamp will be lighted. Also it will be seen that the parts are so constructed and arranged as to be wholly inclosed and shielded from injury, while they are at the same time rendered conveniently accessible for installation, cleaning, repairs, replacement, etc.

It will thus be seen that my invention provides a combined level and plumb embodying illuminating means whereby either level may be electrically illuminated as or when desired, for convenience in using the tool for leveling and plumbing work in dark and otherwise inaccessible places, and that by energizing either one of the lamps sufficient light may be obtained to adapt the device to serve as a searchlight or illuminating agent for the convenience of the user in finding his way at night or in dark places or other dark passages, the advantages of which will be apparent. Furthermore, it will be seen that my invention provides a mechanic's tool which is simple of construction and, while embodying the conveniences and advantages set forth, may be manufactured and sold at a cost but slightly exceeding the cost of an ordinary instrument.

Having described my invention, I claim:

1. In an illuminated level, the combination of a stock, a battery disposed therein, resilient conducting and supporting strips disposed at the top and bottom of the battery and connected with the poles thereof, a lamp supported in contact with one of said strips and having one of its terminals in electrical connection therewith, a contact member connected with the other terminal of the lamp, and a sliding switch movable into and out of engagement with said contact member and slidably connected with the other contact and supporting strip.

2. In an illuminated level, the combination of a stock, a dry battery cell disposed therein, resilient conducting and supporting strips disposed at the top and bottom of the battery cell and connected with the poles thereof, a lamp having one of its terminals resting in contact with the upper contact and supporting strip, a combined supporting and contact member carrying the lamp and connected with the other terminal thereof, a second lamp, conductors connected therewith and provided with contacts, the contact of one of said conductors being normally connected with the upper resilient contact and supporting strip, and a sliding switch member engaging the other resilient contact and supporting strip and movable in reverse directions for respective contact with the supporting and contact member and the contact member of the other conductor of the second named lamp, for independently connecting either of said lamps with the battery.

3. In an illuminated level, the combination of a stock having a chamber therein, a plate closing said chamber, said plate having a slot therein, a sliding actuating device on the outer side of said plate, a sliding switch device on the inner side of said plate and having a connection therewith arranged to move in said slot, a battery cell disposed within the chamber and having a lower resilient supporting and contact strip connected with one of its poles and in sliding engagement with the switch, and having an upper resilient supporting and contact strip connected with its other pole and provided with a contact terminal, a combined lamp supporting and contact member, a lamp supported by said member and having one of its terminals in connection therewith and its other terminal resting upon and supported by the said upper resilient supporting and contact strip, a second lamp, conductors connected therewith and having contact terminals, one of said contact terminals being normally engaged with the contact terminal of the upper resilient supporting and contact strip, and a contact carried by the lower conductor and arranged for coöperation with the switch, said switch being movable in opposite directions to engage the said contact and combined lamp supporting and contact member respectively.

4. In an illuminated level, the combination of a stock, levels carried by the stock, electric bulbs for illuminating said levels, a battery, conductors connected with the poles of the battery, one of said conductors being normally in communication with one of the terminals of each lamp, other conductors connected with the other terminals of the lamps, and a switch device in slidable engagement with the second of the two first named conductors and movable in opposite directions for independent engagement with either of the two last named conductors for energizing either lamp from the battery.

5. In an illuminated level, the combination of a stock, a level tube carried by the stock, a battery, a lamp, a plate carried by the stock, a switch mounted on the plate and movable to connect the lamp with or disconnect it from the battery, an actuating device carried by the plate for transmitting motion to the switch, and a cover carried by the plate to normally protect said actuating device.

6. In an illuminated level, the combination of a stock having a chamber therein, a plate closing said chamber, a supporting and contact strip having a horizontal limb and a vertical limb, a battery disposed within the chamber, resilient contact strips arranged at the top and bottom of the battery and connected with the respective poles thereof, a lamp supported by the horizontal limb of the supporting and contact strip and in electrical contact with one of the resilient contact strips of the battery, a switch slidably mounted upon the closure plate and slidably engaging the other resilient contact strip of the battery, and an actuating device for slidably moving said switch into and out of contact with the vertical limb of the supporting and contact strip, In testimony whereof I affix my signature.

WILLIAM HENRY ROBERTSON.